US011009183B2

(12) United States Patent
Iacob-Clain et al.

(10) Patent No.: US 11,009,183 B2
(45) Date of Patent: May 18, 2021

(54) LENGTH-ADJUSTABLE COLUMN AND MANUFACTURING METHOD THEREOF, PIECE OF FURNITURE

(71) Applicant: STABILUS GMBH, Koblenz (DE)

(72) Inventors: Adriana Iacob-Clain, Fagaras Brasov (RO); Alexandru Borcea, Rasnov Brasov (RO); Florin Petru Brezean, Rasnov Brasov (RO); Guido Lukie, Mülheim-Kärlich (DE)

(73) Assignee: STABILUS GMBH, Koblenz (DE)

( * ) Notice: Subject to any disclaimer, the term of this patent is extended or adjusted under 35 U.S.C. 154(b) by 32 days.

(21) Appl. No.: 16/220,045

(22) Filed: Dec. 14, 2018

(65) Prior Publication Data
US 2019/0186681 A1 Jun. 20, 2019

(30) Foreign Application Priority Data
Dec. 19, 2017 (DE) .................. 10 2017 130 473.8

(51) Int. Cl.
*A47C 3/00* (2006.01)
*F16M 11/00* (2006.01)
(Continued)

(52) U.S. Cl.
CPC .............. *F16M 11/28* (2013.01); *A47B 9/10* (2013.01); *A47B 9/20* (2013.01); *A47C 3/30* (2013.01);
(Continued)

(58) Field of Classification Search
CPC . F16D 3/06; F16C 29/02; F16M 11/28; A47B 9/10; A47B 9/20; A47C 3/30
(Continued)

(56) References Cited

U.S. PATENT DOCUMENTS

| 4,613,106 A * | 9/1986 | Tornero ................. A47C 3/28 248/405 |
| 5,531,413 A * | 7/1996 | Wolf ...................... A47C 3/30 248/188.2 |

(Continued)

FOREIGN PATENT DOCUMENTS

| CN | 2785457 Y | 6/2006 |
| DE | 4313766 A1 | 11/1994 |

(Continued)

*Primary Examiner* — Tan Le
(74) *Attorney, Agent, or Firm* — Schmeiser, Olsen & Watts, LLP

(57) ABSTRACT

Provided is a length-adjustable column with a standpipe having a longitudinal axis, a length-adjustment device arranged in the standpipe with a portion displaceably-mounted along the longitudinal axis with respect to the standpipe and an anti-rotation locking device for locking the portion against a rotation around the longitudinal axis relative to the standpipe. The anti-rotation locking device includes an inner element, which is fastened to an outer surface of the portion, and an outer element, which is fastened to an inner surface of the standpipe. The inner element cooperates with positive locking with the outer element against a rotation around the longitudinal axis, and is displaceably guided along the longitudinal axis by the outer element. The inner element is connected with the portion through a substance-to-substance connecting layer.

6 Claims, 4 Drawing Sheets

Figure 1:
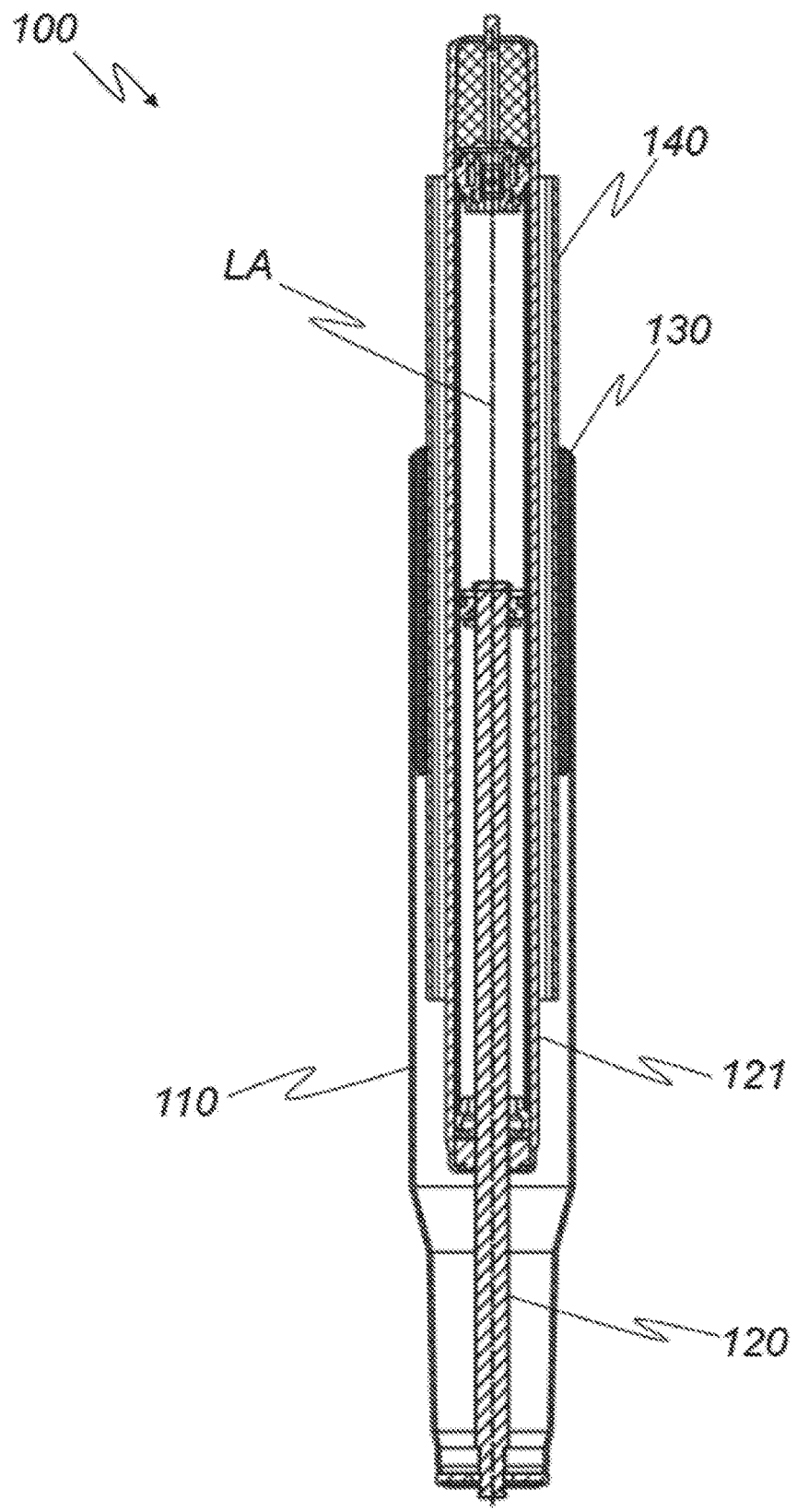

(51) Int. Cl.
*F16M 11/28* (2006.01)
*A47B 9/20* (2006.01)
*F16C 29/02* (2006.01)
*F16D 3/06* (2006.01)
*A47C 3/30* (2006.01)
*A47B 9/10* (2006.01)
*F16F 9/56* (2006.01)

(52) U.S. Cl.
CPC ....... *A47B 2200/0051* (2013.01); *F16C 29/02* (2013.01); *F16D 3/06* (2013.01); *F16F 9/56* (2013.01)

(58) Field of Classification Search
USPC ............. 248/161, 188, 2, 188.5, 404, 406.1; 297/344.18, 344.19; 267/120; 188/300
See application file for complete search history.

(56) References Cited

U.S. PATENT DOCUMENTS

| | | | |
|---|---|---|---|
| 5,944,290 A * | 8/1999 | Fuhrmann | A47C 3/30 248/161 |
| 6,474,619 B1 | 11/2002 | Ma | |
| 7,134,634 B2 * | 11/2006 | Jeon | A47C 3/30 248/161 |
| 2004/0079854 A1 | 4/2004 | Ma | |

FOREIGN PATENT DOCUMENTS

| | | | |
|---|---|---|---|
| DE | 19628721 A1 | 1/1998 | |
| DE | 102014108564 A1 | 8/2014 | |
| EP | 2341262 A3 * | 9/2011 | ............ F16F 9/0281 |

* cited by examiner

LENGTH-ADJUSTABLE COLUMN AND MANUFACTURING METHOD THEREOF, PIECE OF FURNITURE

CROSS-REFERENCE TO RELATED APPLICATION

This application claims priority to German Application No. 10 2017 130 473.8, having a filing date of Dec. 19, 2017, the entire contents of which are hereby incorporated by reference.

FIELD OF TECHNOLOGY

The following relates to a length-adjustable column having a standpipe with a longitudinal axis and a length-adjustment device arranged in the standpipe with a portion displaceably-mounted along the longitudinal axis with respect to the standpipe. The following further relates to a manufacturing method for a length-adjustable column and a piece of furniture with a length-adjustable column.

BACKGROUND

Length-adjustable columns are known from the known art, for example for height adjustment of chairs or tables. Generally, with these columns, besides a length adjustment along an axis, a rotation around this axis is also possible. For certain applications, however, the rotation is to be prevented, for example in case of seating an event hall which should always be oriented towards a stage.

A length-adjustable column for chairs, tables, or the like is known, for example, from patent application DE 4313766 A1, in which a housing of a length adjustment element is displaceably guided along an axis in a standpipe. Through a cooperation of a guide of the standpipe with an anti-rotation locking element fastened to the housing, a rotation of the housing with respect to the standpipe around the axis is prevented. However, if a high torque acts on such a column, a deformation of the anti-rotation locking element and/or a detachment of the anti-rotation locking element from the housing can take place. As a consequence, an anti-rotation locking is no longer ensured for, and the length adjustment can be blocked through a jamming of the anti-rotation locking element with the guide.

DE 19628721 A1 also discloses a length-adjustable and rotationally-secured column, in which an anti-rotation locking profile fastened to a length-adjustable element for anti-rotation locking engages in a counter profile of a standpipe. Because one of the profile parts is arranged in line with the length-adjustment element, the profile parts are not visible during use of the column, and more radial construction space is available for the length-adjustment element. The arrangement according to DE 19628721 A1 comes with the disadvantage, that in a predetermined axial construction space, only relatively short profile parts can be used, which correspondingly only withstand relatively low torque without becoming damaged, which can result in the consequences mentioned with respect to DE 4313766 A1.

SUMMARY

An aspect relates to a length-adjustable and rotationally-secured column to be manufactured in a simple and cost-effective manner, which provides a higher reliability and durability than generic columns, without requiring additional construction space. A further aspect of the invention is to provide a simple and cost-effective manufacturing method for such a column.

A subject-matter of embodiments of the invention is a length-adjustable column with a standpipe having a longitudinal axis. Further included is a length-adjustment device arranged in the standpipe and having a portion displaceably-mounted along the longitudinal axis with respect to the standpipe. At least in a part of a travel path of the length-adjustment device, the portion can be guided or supported rotatably around the longitudinal axis relative to the standpipe. The length-adjustable column can include an anti-rotation locking device to lock the portion against a rotation around the longitudinal axis relative to the standpipe. The embodiment can particularly advantageously be used if the anti-rotation locking device takes effect over the entire travel path.

Advantageously, because it can be cut from prefabricated and, if necessary, standardizable pipes, the standpipe and/or the portion is designed to have a round cross section relative to the longitudinal axis. Particularly, the standpipe is cylindrical at least in sections, so that it is particularly simple to manufacture and, due to the round cross-section and the force-absorption capacity related thereto, isotropic around the longitudinal axis, is mechanically stable. When standpipe and portion are cylindrical, the additional advantage results that they can, for example through a slight rotation against one another around the longitudinal axis, not jam against one another, the length-adjustment device is arranged coaxially in the standpipe, in order to ensure a particularly high mechanical stability during simultaneous reliable and smooth guiding of the length-adjustment device along the longitudinal axis in the standpipe.

The length-adjustment device can for example include a pneumatic or hydro-pneumatic piston cylinder unit, in particular a gas pressure spring, wherein the portion can in particular be a part of a cylinder of the piston cylinder unit.

Through the anti-rotation locking device, it is advantageously ensured for the portion not to rotate around the longitudinal axis relative to the standpipe. When the standpipe is arranged, for example arranged in a stationary manner, on a base, an element rigidly-connected with the portion, for example a seat surface of a chair, can for example be height-adjusted along a vertical axis through the column, without being rotatable around this axis.

The anti-rotation locking device includes, for example, an inner element, which is fastened to an outer surface of the portion, and an outer element, which is fastened to an inner surface of the standpipe. Advantageously, the inner element cooperates, with respect to a rotation around the longitudinal axis, with positive locking with the outer element and is guided displaceably by the outer element along the longitudinal axis, for example.

The inner element can be connected with the portion through a substance-to-substance connecting layer, for example. The connecting layer, for example a welded seam, a soldered layer, and/or an adhesive layer, produces a mechanically particularly stable connection between the inner element and the portion. The connection is in particular significantly more stable than a connection of an anti-rotation locking profile with a housing through thermal press-fitting described in DE 43 13 766 A1, for example. The particularly stable connection ensures for the antirotation locking device to withstand higher torque, without the inner element detaching from the portion. Thus, the reliability and service life of the column increase.

The inner element can consist of a material having a strength that is at least as high as that of the portion. Here and in the following, high strength means that the material can withstand a high stress or a high pressure, without deforming or failing. A material of high strength ensures that the anti-rotation locking device withstands high torque, without the inner element being deformed, which could lead to a jamming with the outer element and/or a loss of the antirotation locking function. Further, structures, for example protrusions, of the inner element, which cooperate with positive locking with the outer element to prevent rotation, can be configured to be smaller by using a material of higher strength, so that the inner element, and thus also the column as a whole can be constructed more compactly.

In the known art (e.g. DE 43 13 766 A1), in contrast, is used an anti-rotation locking profile of a less strong material than the housing, on which it is applied, in order not to damage the housing when applying the anti-rotation profile, in particular with a deforming method such as, for example, through thermal press-fitting. A damaging of the housing is particularly to be avoided for safety reasons, when it is part of a pressure cylinder, for example of a gas pressure spring. Only through connecting, according to embodiments of the invention, of the inner element with the portion, is it possible to use a material of higher strength for the inner element, without risking to damaging the portion.

For a structure of the column as simple as possible, and for a particularly stable substance-to-substance connecting layer, the inner element and the portion consist of or include the same material. The inner element and/or the portion for example consist of a steel, in particular with a hardened surface. A hardened surface can be provided by means of for example nitriding of the steel. It can reduce the wear, in particular of the inner element, upon a displacement along the outer element.

The outer element can consist of a plastic material, in particular of a self-lubricating plastic material, for example of polyoxymethylene. The outer element, in particular also with a structured inner surface, for example by grooves, can be produced of a plastic material in a fast and cost-effective manner. Further, an outer element of a plastic material has, as a rule, a lower mass than one of a metal or ceramic material. Furthermore, a, in particular self-lubricating, plastic material has a lower friction relative to an inner element, for example of metal, so that the outer element and the inner element can be smoothly displaced relative to one another, and thus, a length of the column can be smoothly adjusted.

As the outer element is arranged outside of the inner element in relation to the longitudinal axis, it has a larger circumference, and structures cooperating with positive locking against a rotation can be formed on the outer element with higher material strength than on the inner element. Therefore, also with a material of the outer element, for example a plastic material, which is less strong than a material of the inner element, for example a metal, a sufficiently high stability of the structures of the outer element and thereby an anti-rotation locking against high torque can be ensured.

The inner element and the outer element are advantageously shaped as to be complementarily to one another. "Shaped complementarily" in the context of embodiments of the invention means, that a distance, radially to the longitudinal axis between the inner element and the outer element, is of the same size in all radial directions. Advantageously, the distance is as small as possible. The complementary shape allows for a particularly stable and precise guidance of the inner element through the outer element, in particular when the distance is small, i.e. only little mechanical clearance is present.

The outer element can include a cylindrical outer base body with a number of, for example one, two, three, four or five grooves in an inner surface of the outer base body. The inner element can include a cylindrical base body with a number of, for example one, two, three, four or five protrusions engaging in the grooves on an outer surface of the base body. Advantageously, the grooves and/or protrusions are uniformly distributed, that is with the same angular distance from one another, around the longitudinal axis so that a uniform force distribution is ensured. The outer element and/or the inner element can in particular be shaped like the guide sleeve or the anti-rotation profile, which are described by Column 2, Page 56 to Column 3, Page 62 of the publication DE 4313766 A1, which is incorporated herein by reference.

The outer element can be formed integrally with the standpipe, for example of plastic material, in order to reduce the number of parts of the column, and therefore the production costs.

A transition area of protrusions of the inner element to an inner base body of the inner element and/or an end of the protrusions that faces away from the inner base body can be rounded. The roundings prevent that the inner element cants with the outer element, and that there are strain concentrations in the transition are or at the end of the protrusions, which could lead to material failure. The roundings can come with the disadvantage that these reduce an effective contact surface between the inner element and the outer element for receiving a torque between the elements. The maximum torque that the anti-rotation device withstands, could thereby be reduced. Such an effect, however, can, according to embodiments of the invention, be compensated by choosing a material of sufficient strength for the inner element, for example.

In an advantageous configuration, an inner element length parallel to the longitudinal axis corresponds to at least the sum of an outer element length parallel to the longitudinal axis plus a travel path of the length adjustment device. This ensures that the outer element can guide the inner element over the entire travel path with the entire outer element length, thus resulting in a particularly stable and precise guidance.

The method according to embodiments of the invention for manufacturing a length-adjustable column, in particular according to embodiments of the invention, includes at least the following steps:

a. Providing a length-adjustment device with a, cylindrical, portion and an inner element of an anti-rotation locking device with a, cylindrical, inner base body, wherein an outer diameter of the portion is smaller than or equal to an inner diameter of the inner base body;

b. coaxially arranging the portion in the inner base body and c. substance-to-substance connecting of the inner base body with the portion.

Due to the fact that the outer diameter of the portion, in particular in a, non-controlled, ambient temperature at least one of from 10° C. to 30° C., or 15° C. to 25° C., is smaller or equal to an inner diameter of the inner base body, the portion can particularly simply be arranged in the inner base body, for example inserted therein. In particular, it is then not necessary to reshape the portion or the inner base body for the arranging process, for example mechanically or through a heating or cooling. Additional method steps are thereby omitted, and a risk of damaging of the portion or of the inner base body is reduced.

Through the substance-to-substance connecting, for example a welding, soldering and/or a bonding, after the arrangement, a very firm connection of the inner base body with the portion can be achieved. In particular, in contrast to mechanical connecting methods like screwing or riveting, a smooth connection over a large surface can be achieved, which leads to a n equal distribution of tension, and thus to a reduced mechanical point load of the portion and the inner base body.

The method can include an applying, for example a brushing or spraying, of an adhesive, a metal adhesive, onto an outer surface of the portion and/or an inner surface of the inner base body, in particular prior to the arrangement. Through an adhesive, for example a two-component adhesive, a substance-to-substance connecting can be effected without risking a corrosion, such as for example with a welded connection.

The application can also be effected over the entire outer surface of the portion. This will achieve a large scale and uniform adhesion with a high strength and a uniform stress distribution.

The application can be effected in an amount sufficient to fill a space that forms between the portion and the inner base body during arrangement. Advantageously, minor deviations of the portion and/or the inner element from their target dimensions can thus be compensated for through the adhesive, so that these can be produced with greater tolerances, and thus be produced more quickly and/or more cost-effectively. For example, minor deviations of the outer diameter of the portion or of the inner diameter of the inner base body from their desired values can be compensated for, without impairing the strength of the connection of portion and inner element. In particular, the portion and/or the inner element can be produced with greater tolerances than if they were to be connected through a pressing as in the known art (e.g. DE 4313766 A1).

The provision can include a cold drawing of the portion and/or the inner base body. Through cold drawing, the portion and the inner base body can be produced quickly and costeffectively, in particular without thermal stress.

The provision can include a curing of a surface of the portion and/or the inner base body, for example through a nitriding of a steel surface. Through a curing of a surface, in particular of the inner base body, its wear resistance, and thus the reliability and durability of the column are increased.

A piece of furniture according to embodiments of the invention, in particular a chair or table, includes a column according to embodiments of the invention, in particular as part of a chair leg or table leg. Therethrough, a height of the chair or the table can advantageously be modified through a length-adjustment of the column, without the chair or table being able to rotate around the longitudinal axis of the standpipe of the column. The term "chair", according to embodiments of the invention means any form of seating furniture, in particular a chair, a stool, a seat, or an armchair. A "table", in the context of embodiments of the invention, can in particular be a desk, conference table, dining table, standing table, lab table, a work surface, or a workbench.

BRIEF DESCRIPTION

Figure 2:
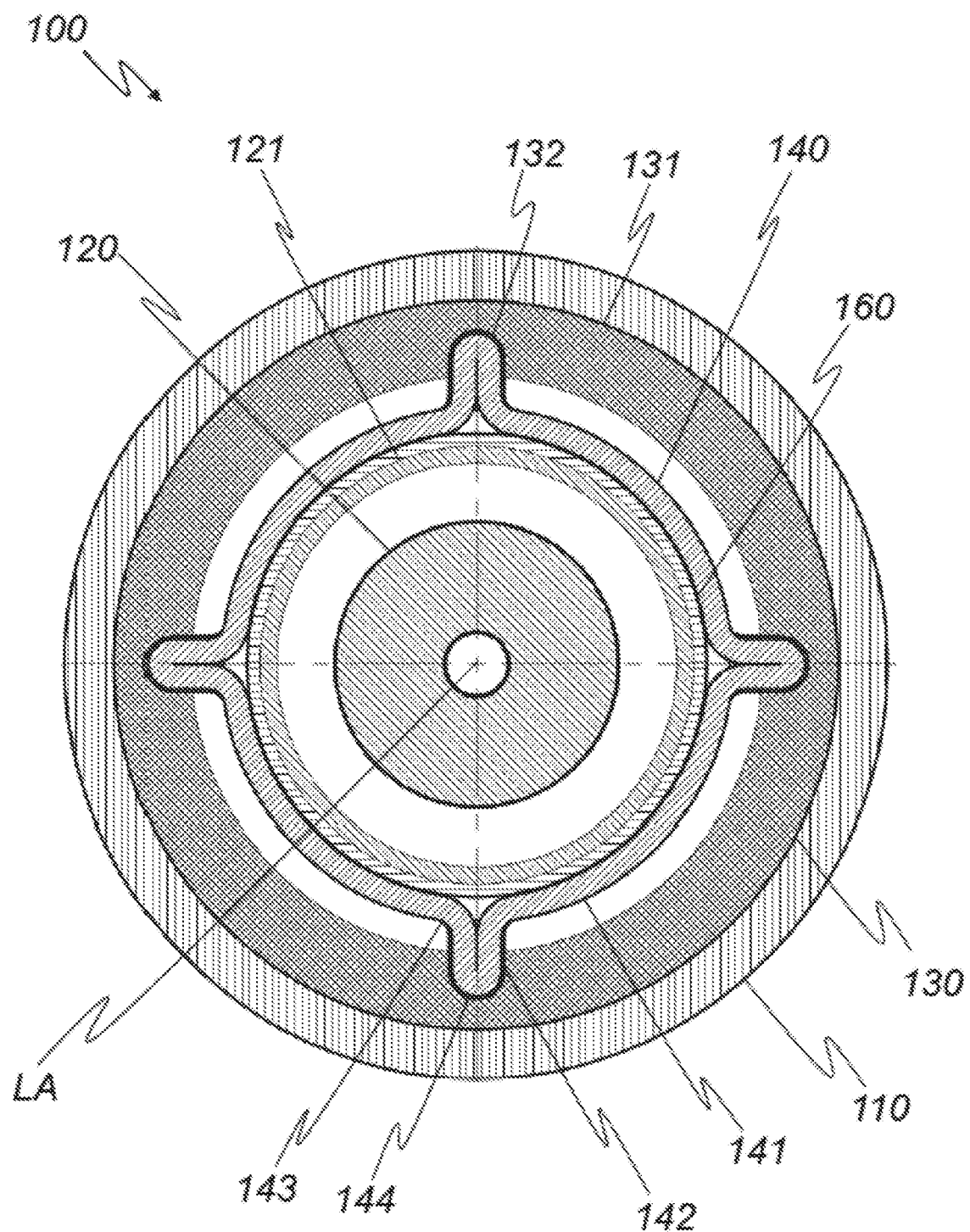
Figure 3:
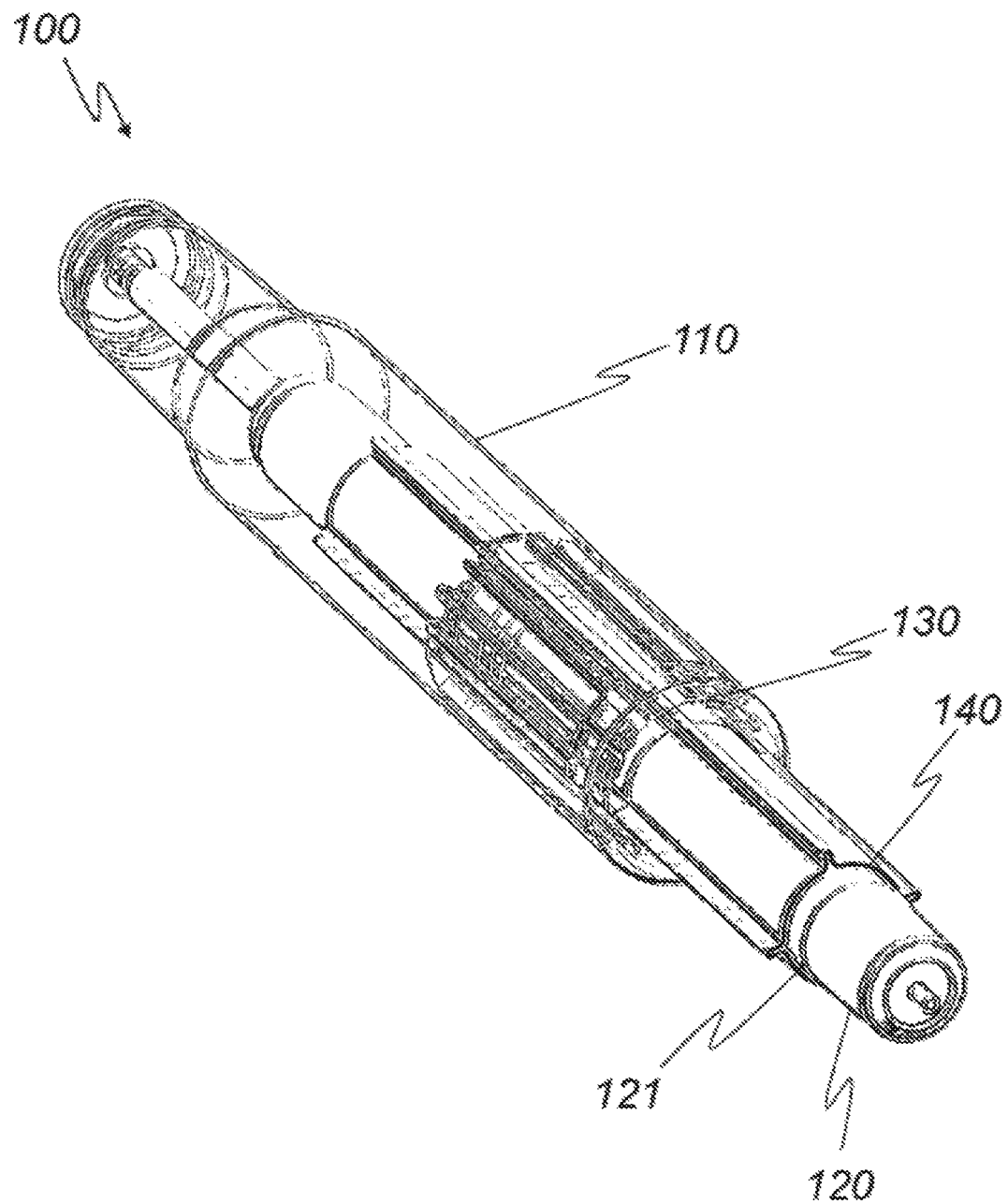

Some of the embodiments will be described in detail, with reference to the following figures, wherein like designations denote like members, wherein:

FIG. 1 a schematic longitudinal section of a column;
FIG. 2 a schematic cross-section of a column;
FIG. 3 a schematic perspective illustration of a column; and
FIG. 4 a schematic illustration of a method.

DETAILED DESCRIPTION

FIG. 1 shows a schematic longitudinal section along a longitudinal axis LA of a standpipe 110 of a column 100 according to embodiments of the invention. The standpipe 110 can, for example, be configured to be rigidly connected with a foot of a chair with its lower end in the illustration. A length-adjustment device 120 is arranged in the standpipe 110, which for example includes a piston cylinder unit. The length adjustment device 120 is, for example, rigidly connected with the standpipe 110 with its lower end in the representation. The upper end of the length-adjustment device 120 in the illustration can, for example, be designed for rigidly connecting with a seat of a chair. Through a length adjustment of the length-adjustment device 120, can thus be adjusted a distance between the seat of the chair from its foot, and thus a seat height, for example. The standpipe 110 and the length-adjustment device 120 are, for example, substantially cylinder-shaped, and arranged coaxially to the longitudinal axis LA.

The longitudinal adjustment device 120 includes a portion 121, for example a part of a cylinder housing of a piston cylinder unit, onto the outer surface of which is fastened an inner element 140 of an anti-rotation locking device. The inner element 140 can be connected to the portion 121 through a substance-to-substance connecting layer (not illustrated), for example an adhesive layer.

The inner element 140 cooperates, with positive locking, with an outer element 130 relative to a rotation around the longitudinal axis LA, said outer element being fastened to an inner surface of the standpipe 110, and is displaceably guided along the longitudinal axis LA by the outer element 130. The inner element 140 and the outer element 130 thus form an anti-rotation locking device 150 for securing the portion 121 against a rotation around the longitudinal axis LA relative to the standpipe 110.

FIG. 2 shows a schematic cross-section orthogonally to the longitudinal axis LA of the column 100 illustrated in FIG. 1. In this illustration can be discerned the substance-to-substance connecting layer 160 between the inner element 140 and the portion 121. Furthermore, this illustration shows that in the illustrated example, the outer element 130 is for example composed of a cylindrical outer base body 131 with a number of, e.g. four, grooves 131 on an inner side. The grooves are in particular in each case spaced from one another other by 90° around the longitudinal axis LA. The illustration furthermore shows that the inner element 140 is composed of a cylindrical inner base body 141 with a number of, for example four in the represented example, protrusions 142 on an outer side. The protrusions engage with positive locking into the grooves 132, in particular with respect to a rotation around the longitudinal axis LA.

A transition area 143 of the protrusions 142 to the inner base body 141 and an end 144 of the protrusions 142 that faces away from the inner base body 141 can in each case be rounded, particularly as illustrated in FIG. 2.

FIG. 3 shows a schematic perspective illustration of the column 100 illustrated in FIG. 1 and FIG. 2.

Figure 4:
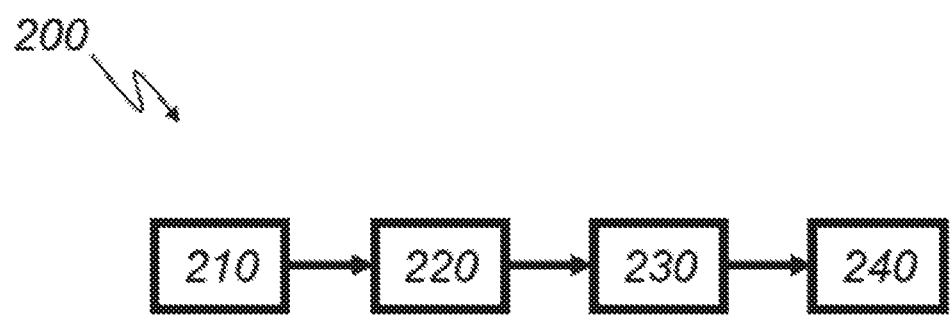

FIG. 4 shows a schematic illustration of a method 200 according to embodiments of the invention. The illustrated method 200 includes a provision 210 of a length adjustment device 120 with a, in particular cylindrical, portion 121 and a, in particular cylindrical, inner element 140 of an anti-rotation locking device with an inner base body, with an outer diameter of the portion 121 being smaller or equal to an inner diameter of the inner base body 141. The portion 121 and the inner base body 141 are, for example, provided through cold drawing from a steel.

The provision 210 is followed by an application 220, for example, such as a brushing, of a metal adhesive on an outer surface of the portion 121.

After the application 220, for example, an, in particular coaxial, arranging 230 of the portion 121 in the inner base body 141 is effected, for example, by inserting the portion 121 into the inner base body 141.

After the arranging 230, e.g. a substance-to-substance connecting of the inner base body 141 with the portion 121, is effected, for example through a hardening of an adhesive.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE CHARACTERS 100 column
110 standpipe
120 length-adjustment device
121 portion
130 outer element
131 outer base body
132 groove
140 inner element
141 inner base body
142 protrusion
143 transition area
144 end
160 connecting layer
200 method
210 providing
220 application
230 arranging
240 connecting

The invention claimed is:

1. A length-adjustable column having
   a. a standpipe with a longitudinal axis and
   b. a length-adjustment device arranged in the standpipe, with a portion displaceably-mounted along the longitudinal axis with respect to the standpipe, wherein
   c. an anti-rotation locking device for locking the portion against a rotation around the longitudinal axis relative to the standpipe,
   d. wherein the anti-rotation locking device includes an inner element, which is fastened to an outer surface of the portion, and an outer element, which is fastened to an inner surface of the standpipe,
   e. wherein the inner element cooperates with positive locking with the outer element relative to a rotation around the longitudinal axis, and is displaceably guided along the longitudinal axis by the outer element, and the inner element is connected with the portion through a substance-to-substance connecting layer, wherein
   f. the inner element consists of a material having a strength that is at least equally high as that of the portion.

2. The column according to claim 1, wherein the inner element includes a steel with a hardened surface.

3. The column according to claim 1, wherein the outer element includes of a self-lubricating plastic material of polyoxymethylene.

4. The column according to claim 1, wherein the inner element and the outer element are shaped to be complementary to each other, wherein
   g. the outer element includes a cylindrical outer base body with a number of grooves in an inner surface of the outer base body and
   h. the inner element includes a cylindrical base body with a number of protrusions engaging in the grooves on an outer surface of the base body.

5. The column according to claim 4, wherein a transition area of protrusions of the inner element toward an inner base body of the inner element and/or an end of the protrusions that faces away from the inner base body is rounded.

6. A piece of furniture, which is a chair or a table, with a column according to claim 1.

* * * * *